US007244929B2

(12) United States Patent
Rodi

(10) Patent No.: US 7,244,929 B2
(45) Date of Patent: Jul. 17, 2007

(54) ENCODER WITH ABSOLUTE SIGNAL PROCESSING AND INCREMENTAL SIGNAL OUTPUT AND METHOD OF USING SUCH AN ENCODER

(76) Inventor: Anton Rodi, Karisruher Strasse 12, Leimen (DE) D-69181

( * ) Notice: Subject to any disclaimer, the term of this patent is extended or adjusted under 35 U.S.C. 154(b) by 0 days.

(21) Appl. No.: 11/224,375

(22) Filed: Sep. 12, 2005

(65) Prior Publication Data

US 2006/0060764 A1    Mar. 23, 2006

(30) Foreign Application Priority Data

Sep. 20, 2004  (DE)  ................ 10 2004 045 849

(51) Int. Cl.
*G01D 5/34* (2006.01)
*H03M 1/22* (2006.01)
*G01C 17/38* (2006.01)

(52) U.S. Cl. ............... 250/231.18; 341/11; 73/1.75

(58) Field of Classification Search .......... 250/231.13, 250/231.14, 231.18; 341/11, 3; 73/1.75, 73/1, 79

See application file for complete search history.

(56) References Cited

U.S. PATENT DOCUMENTS

| 5,438,330 | A  | * | 8/1995 | Yamazaki et al. | ............ 341/11 |
| 6,434,516 | B1 |   | 8/2002 | Topmiller | .............. 702/198 |
| 6,591,220 | B1 |   | 7/2003 | Rodi | .................... 702/158 |
| 6,741,199 | B2 |   | 5/2004 | Gärtner et al. | ............ 341/158 |
| 6,847,031 | B2 | * | 1/2005 | Shiga | ............... 250/231.13 |
| 2005/0137738 | A1 | * | 6/2005 | Carlson et al. | ............ 700/122 |

FOREIGN PATENT DOCUMENTS

| CH | 683 641 A5 | 4/1994 |
| DE | 198 25 378 A1 | 12/1999 |
| EP | 1 102 039 A1 | 5/2001 |

* cited by examiner

*Primary Examiner*—Thanh X. Luu
*Assistant Examiner*—Brian Livedalen
(74) *Attorney, Agent, or Firm*—Laurence A. Greenberg; Werner H. Stemer; Ralph E. Locher

(57) ABSTRACT

An encoder device for the determination of absolute angle or linear segments is described, with which the distance from the actual to the reference position is determined upon prompting and output via incremental signals. This encoder offers new functions for the incremental measuring system employed up to now. The transition to the absolute measuring system is also made possible according to requirements.

18 Claims, 3 Drawing Sheets

ENCODER WITH ABSOLUTE SIGNAL PROCESSING AND INCREMENTAL SIGNAL OUTPUT AND METHOD OF USING SUCH AN ENCODER

This invention was developed under Office of Naval Research Government Contract No. N00014-02-C-0250. The government may have certain rights in this invention.

BACKGROUND OF THE INVENTION

FIELD OF THE INVENTION

The invention relates to an encoder device for determining absolute angle and/or linear segments, more specifically an encoder device with absolute signal processing and incremental signal output, and a method for determining absolute angle and/or linear segments with such an encoder device.

Two types of encoders for measuring angle and/or linear segments are familiar in industrial applications: incremental and absolute encoders.

Incremental encoders record the incremental scales/measuring disks by means of a scanning device and then pass them on as incremental signals to a control unit for evaluation. The incremental signals are predominantly embodied in well-known semiconductor level signals with so-called A-, B- and R-tracks. The B-track is shifted approximately 90° of the incremental period to the A-track in order to record the direction of motion. The R-track, or reference track, indicates, e.g. for rotary encoders, the reference position during the revolution, and for linear segment encoders the reference position to the scale. The incremental signals are also occasionally implemented in sin/cos signals (A-, B-signals) in the case of transmission lines that are long and prone to interference and the primary control itself is to generate higher resolutions of incremental segments.

Incremental encoders are widely used, as they have advantages in the cost-effective production of the scales and the scanning device as well as evaluation in the control compared with absolute encoders.

Absolute encoders record the correspondingly formed scales/measuring disks and/or rotors/stators by suitable scanning devices with signal processing which are then, in the form of measured values, processed as absolute values in a primary control unit. In servo technology with highly resolved angle and/or linear segments the measured signals were separated in the encoder into absolute binary base values and sinusoidal increment signals and transmitted separately to the control for formation of the total absolute value. Since the Hanover Fair in 2000 absolute encoders which carry out the entire signal processing to create the total absolute value in the encoder and transmit it serially, e.g. via an SSI interface, to the control as a complete measured value are generally known. The patent application EP 1102039 A1 (corresponding to U.S. Pat. No. 6,591,220) describes such an angle and linear segment measuring device.

The increasing integrative capability of electronic measuring equipment favors more cost-effective implementation of functions with absolute encoders so that incremental encoders are increasingly being replaced with new developments. The simultaneous measures of encoder manufacturers, machine and equipment manufacturers as well as control manufacturers are obstructive in the process of switching to absolute encoders. The stocking of replacement parts, both of encoders and controls for long-life products, also makes the process of conversion more difficult. Thus special efforts and design measures are required in order to make the employment of such encoder designs possible.

SUMMARY OF THE INVENTION

It is accordingly an object of the invention to provide an encoder device for determining absolute angle or linear segments and a method for determining absolute angle or linear segments with such an encoder device, which overcome the above-mentioned disadvantages of the heretofore-known devices and methods.

The inventive solution makes a useful contribution when it comes to facilitating the process of conversion to absolute encoder technology and makes the introduction of evolutionary design in incremental encoders for both encoder manufacturers as well as plant, machine, equipment and control manufacturers possible over the short term.

The basic concept behind the solution is based on continuing development of the encoder with a scanning device for the formation of absolute angle or linear segments and output of measured values by means of direction-controlled incremental signals. This is achieved in accordance with the embodiment and method of this invention as specified in the claims.

In patent specification CH 683641A5 an interface to absolute encoders with method and embodiment is described with which incremental signals are obtained through conversion of the output signals of the absolute encoder. These output signals are then processed via a processing unit in the same manner as those of an incremental encoder; whereby, however, the physical zero-travel is replaced by a virtual zero-travel. Apart from the additional expenditure on electronics for implementing the method of the separate interface and the additional space required as well as the installation expenditure in the absolute encoder, the method together with its embodiment has clear disadvantages. Thus it is presupposed that the reference position forms the point of reference to the absolute measured value, the so-called zero position. However, this does not apply in the case of many absolute encoders, e.g. in the case of a linear position encoder, whose absolute measured value will remain related to the scale length and a reference position can be arbitrarily stipulated. The method also only permits virtual zero-travel approximately at standstill if the errors through operating motion are to remain within the tolerable range. Thus the initializations of such virtual zero-travel are only activated when switching on or after a current and/or a mains interruption and operation released only after zero-travel is completed. Thus zero-travel is also not permitted even with low operating speeds, so that these must be reduced to the conditions of standing adjustment devices. This is disadvantageous since generally during the entire operating sequence the primary control must constantly record and also process the incremental pulses without error and only permits examination with zero travel. With continuous operation, e.g. 2 hours, and average adjustment speeds of 1 m/sec without reaching the zero position and a measuring resolution of approximately 1 μm, approximately $7 \cdot 10^{12}$ pulses are to be transmitted and recorded without interference if no mispositioning is permitted. This is already in the critical range of industrial applications and represents an omission as regards this solution since it is precisely the recording of absolute measured values that permits constant monitoring of the position and cannot be arbitrarily used.

The embodiment according to this invention permits recording of the reference position at any time during the entire operation and to a large extent contributes toward increasing the reliability and security of incremental measurement transmissions far beyond known incremental measuring systems. Moreover, additional functions concerning position queries and multi-turn evaluations are made possible in order to thus extend the incremental measurement processing and to provide for the desired transition toward universal use of absolute rather than incremental encoders.

Special prerequisites neither have to be met by the physical principle of action, e.g. optically, magnetically, inductively, capacitively, acoustically, etc. nor the design for the formation of absolute measured values by means of corresponding scanning devices and scales. The current resolutions of such measuring systems increase in the μm range and below, as well as for measuring speeds of up to 10 m/sec. So that a multiplicity of functions can be implemented, it is advantageous if conversions of the predominantly analog sensor signals in digital measured values occur in the shortest time intervals possible, e.g. $\geq 10$ Bit in $\leq 30$ nsec, as is described in more detail in the patent specification U.S. Pat. No. 6,741,199.

Other features which are considered as characteristic for the invention are set forth in the appended claims.

Although the invention is illustrated and described herein as embodied in an encoder with absolute signal processing and incremental signal output and a method using such an encoder, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
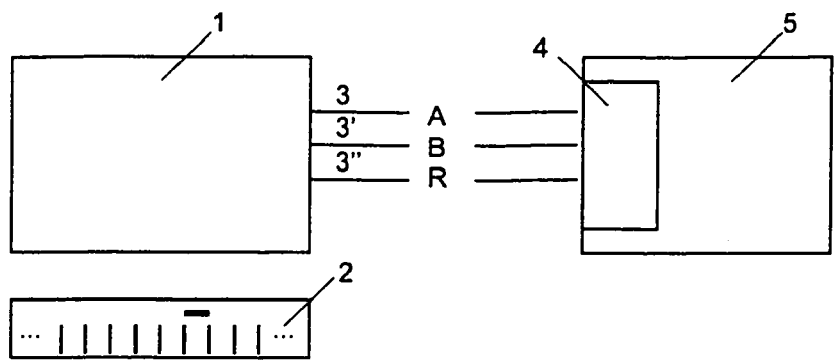
FIG. 1 shows a conventional incremental measuring system.

FIG. 1 shows a conventional encoder 1 with a scale 2 for incremental measurements and measurement processing 4 of the A-, B-, R-signals 3, 3', 3" in the primary control unit 5. From the A-, B-, R-signals the digital incremental signals (high, low) resulting from relative movement between the scale 2 and the encoder 1 are numerically recorded according to direction from a reference position and evaluated in the control unit to measured values for the actual position. It is customary to evaluate the incremental signals on the basis of a time reference, e.g. by means of an already existing clock-pulse generator or oscillator for synchronous signal evaluation with the digital logic in order to determine the adjustment speed of the measuring device. In the case of higher resolutions of the incremental measuring device, e.g. through analog signal transmission of A-/B-signals 3, 3' in the sin/cos characteristic and highly accurate analog-digital conversion in measurement processing 4, the measured data with regard to position, speed and even acceleration are determined. However, this is only possible to a limited extent since, e.g. for digital A-/B-signal transmission, the frequency $f_T$ is limited to approximately 100 to 200 kHz at the highest operating speed. Thus the resolution of such incremental encoders is inevitably limited during operation. For example, for maximum speeds n=6000/min (corresponds to $f_D$=100 Hz) and circumference U of the measuring disk of approximately 100 mm, the resolution S is given where $$S = \frac{U}{2^{nBit}}; \quad S \cdot f_T = U \cdot f_D; \quad f_T = 100 \ldots 200 \text{ kHz}$$

$$S = U \cdot f_D / f_T; \quad f_D = n/60 \approx 100 \text{ Hz}$$

$$\frac{1}{2^{nBit}} = \frac{f_D}{f_T} \rightarrow 2^{nBit} = \frac{f_T}{f_D} = \frac{100 \ldots 200 \text{ kHz}}{100 \text{ Hz}} = 10 \ldots 20 \cdot 10^3$$

which corresponds to a resolution nBit 13 . . . 14 Bit and is thus limited to the approximately 10,000 maximum increments per circumference and revolution.

It is precisely with low operating speeds up to standstill that one demands the highest position accuracy as well as resolution and derivation from the speed as well as acceleration. This, however, is limited because of the maximum frequency $f_T$ of the signal transmission with the highest rotational frequency (speed) $f_D$, and is often no longer sufficiently ensured with increasing position accuracy. In addition, recording of the multiplicity of pulses by the control unit necessarily becomes unreliable and incorrect because of the high resolution. One can attribute this statistically to the error rate of the transmission path and the evaluation unit. However, incorrect pulse counting is also to be expected with disturbances through network conditions or interrupts in the control unit which require reference travel that is not always feasible up to the reference mark for examination of the reference position and thus the actual position. Compared with absolute encoders the familiar incremental encoders are at a disadvantage when it comes to the resolution as well as the reliability and security of the measured values and their transmission.

Basically, the scale 2 may be located within or outside the encoder 1, and the measured value processing 4 within, on or outside the control unit 5. This also applies analogously to FIGS. 2 to 6 described in the following.

Figure 2:
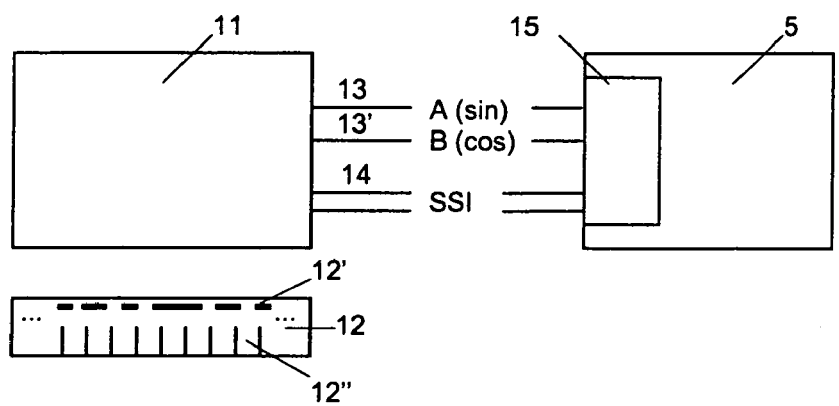
FIG. 2 shows a conventional absolute measuring system.

FIG. 2 shows a so-called SinCos absolute encoder 11 with an absolute scale 12 that includes absolute coding 12' (PRC or gray code) with sin/cos signal characteristics recordable segments 12". The incremental signals are constantly transmitted as sin/cos-type A/B signals 13, 13' to the measurement processing 15 of the primary control unit 5. The base absolute values, i.e. the absolute values of the segments, are transmitted on query via a serial interface 14. The measurement processing 15 records the reference position of this absolute value and combines the fine absolute value obtained from the A/B signals 13, 13' (sin/cos) with the base absolute value to form a total absolute value for the control. This design of the absolute encoders with higher resolution has the advantage that the base absolute values for the reference position can be used without reference travel—even if only to a limited extent during standing and/or relatively slowly moving measuring travel—and the range of the signal transmission is noticeably reduced by the sin/cos incremental values. Separate recording of measured signals in the encoder 11 and separate measurement data processing in the control unit 15, 5 continue to be disadvantageous. In addition, this is influenced by the expenditure for separate electronics, cables and plugs for the still interference-prone sin/cos signal transmission and the still uncertain numerical composition of the fine absolute value in the control unit 15, 5 with the base absolute value which is capable of being sporadically requested for the total absolute value.

Figure 3:
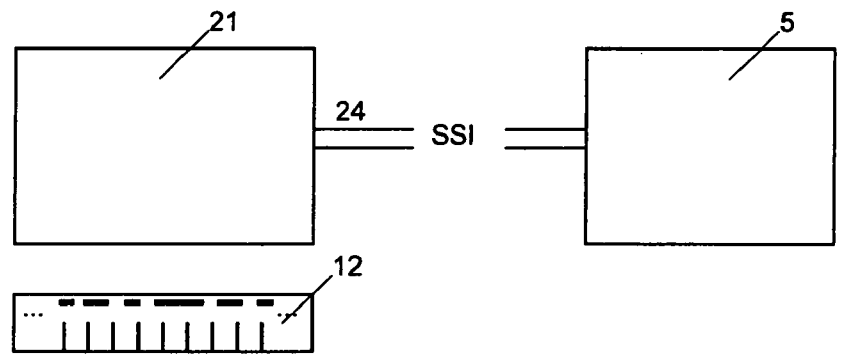
FIG. 3 shows a newer generation absolute encoder.

FIG. 3 shows the design of the absolute encoder 21 with the absolute scale 12 where the entire measuring system is in the encoder 21 and the total absolute values of the angle and/or linear segments, e.g. by means of binary data formats, are transmitted to the control 5 via a serial interface 24, e.g. in SSI design. This system transmission requires the least cable and plug expenditure and has the highest security in both signal and measurement data processing. The analog signal transmissions prone to interference together with the additional expenditure on electronics in the control 5 are omitted and the measuring system is capable of redundantly monitoring itself at any time and reporting the errors or failures in the encoder. Integration of the electronics of the entire encoder and sensors by means of ASIC provides for the most cost-effective and ultra-fine resolution measured signal processing with a high level of reliability. Furthermore, measurement data transmission and parameterization can be performed via the serial interface in several microseconds. Interpolators with the highest resolution as well as measurement data processing under 30 nsec as described, for example, in more detail in patent specification U.S. Pat. No. 6,741,199 have contributed to this end.

In addition, there appear to be new absolute encoders, which simplify the designs of scales and/or measuring disks including scanning device as described, for example, in patent application DE 10117 193.5. The disadvantages of the fixed-code scale tracks over the entire measuring length are eliminated and cost-effective recording of absolute measured values for any scale length and diameter is made possible. Thus absolute encoders are to be flexibly implemented based on the diameter of measuring disks and favor the incremental designs of the embodiment according to the invention by means of absolute measured signal processing.

Figure 4:
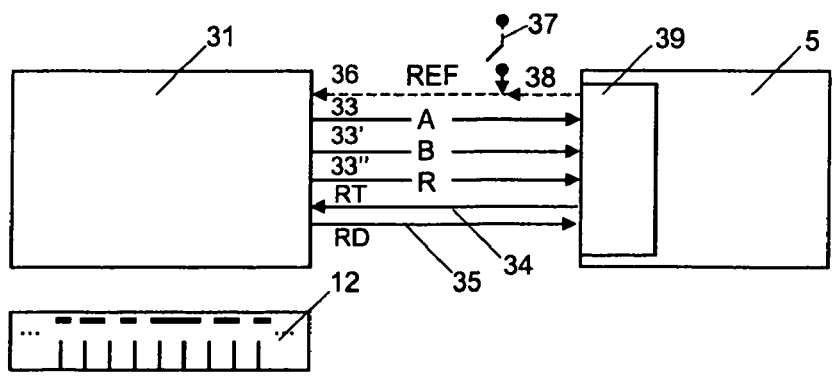
FIG. 4 shows a variant of the encoder according to the embodiment and method of the invention.

FIG. 4 makes use of absolute measured signal recording and measurement processing as advantageously described, for example, in FIG. 3. The encoder 31 with scale 12 thus includes the absolute measured data processing with the incremental output according to the invention of at least A/B signals 33, 33' to the measurement processing 39 of the control 5. Included are the prompt 34 according to the invention for output of the distance of the actual value with respect to the reference position—hereinafter referred to as RT 34—and output 35 of the distance from the beginning to the end are recorded and provided for evaluation—hereinafter referred to as RD (35)—between the encoder 31 and the measurement processing 39 together with the control 5. Where required the R-track 33" is also brought out by the encoder 31, in particular for indication of the entered reference position during the measuring travel and in multi-turn operation for the output of the reference position values of the encoder 31 in the case of prompt RT 34 according to the invention. In FIG. 4 input 36 of the reference position to the encoder 31—hereinafter referred to as REF 36—is effected, for example, via a separate entry point by means of a limit switch 37, or by the measurement processing 39 of the control unit 5 itself by means of a signal output 38.

Figure 7:
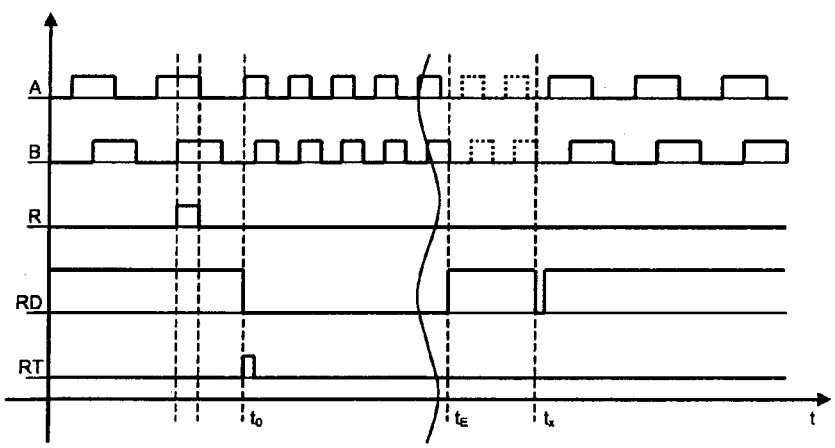
FIG. 7 is a diagram for sequences of single turn encoder signals according to FIG. 4.
Figure 9:
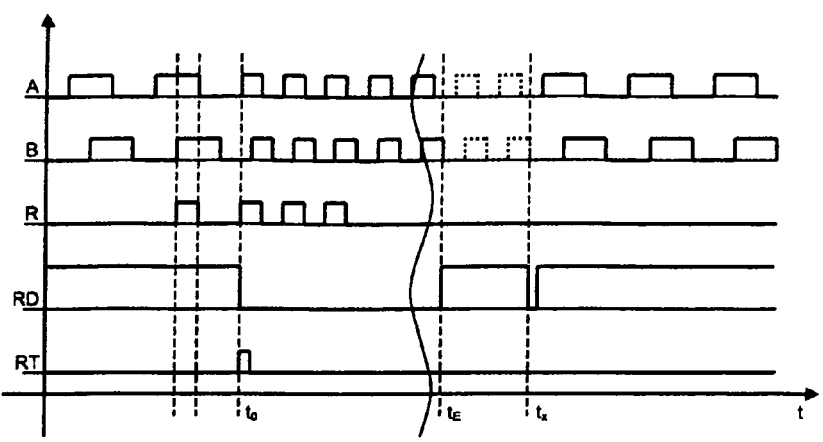
FIG. 9 is a diagram for multi-turn encoder signals according to FIG. 4.

Instead of using RT 34 the external prompt can also be effected, for example, internally in the encoder 31 through MAINS-ON and output RD 35 determined via the signal frequency of the A/B signals and the pulse string, as described in more detail in FIGS. 7 and 9. Then the signal paths RT 34 and RD 35 may be omitted.

As already mentioned in the description of FIG. 3, absolute value formation in the encoder 31 is completely independent from the design of the scale 12 including the scanning device and the selected principle of physical measurement of the sensors. Which mains and/or auxiliary power (e.g. battery) is used to this end or in addition to the formation of absolute values is also unimportant for application of the encoder 31 according to the invention and thus find no further mention in the description.

In order to represent the inventive train of thought as clearly as possible, line-bound signal and data exchange between the encoder 31 and the measurement processing 39 was selected. This representation shall be maintained although the signal and data transmission in any design of the line-bound or wireless form is included expressly in the protection according to the invention. Likewise, this includes functions of the embodiment and methods according to the invention which can be used in combining the described signal and data transmissions in coded or un-coded form between the encoder 31 and measurement processing 39.

Figure 5:
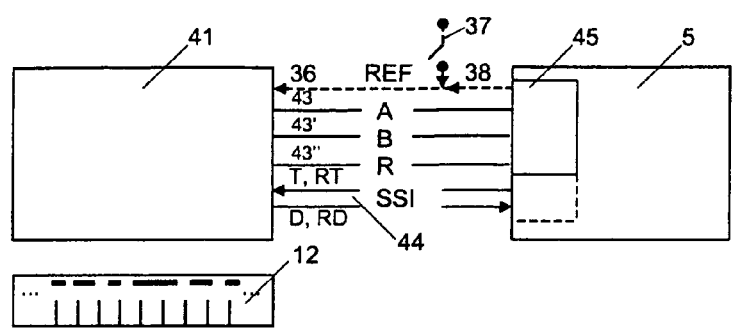
FIG. 5 shows a modified variant of the encoder according to the embodiment and method of the invention.

FIG. 5 describes a further embodiment of the encoder 41 according to the invention with the incremental output signals A/B/R 43, 43', 43" for measurement processing 45 in the control 5. In this case connections of a serial interface 44, e.g. in a familiar SSI configuration, with clock line T 44 and data line D 44, also serve as prompt RT and output RD between the encoder 41 and the measurement processing 45 (indicated by the dashed lines in FIG. 5), or are directly connected with the control 5. Thus both the signal exchange according to the invention indicated in FIG. 4—input REF 36, 37, 38 is required only to this end—and the inventive combination of incremental signal output A/B/R (43, 43', 43") with serial interface 44 for the data and parameter exchange according to the embodiment in FIG. 5 can be achieved. In addition, with familiar means this configuration alone also allows for the exchange of absolute measured values and parameters via the serial interface 44, as described in FIG. 3. Other combinations of the signal and data exchange are selectable as well, e.g. the serial interface 44 in combination with the incremental signal outputs, in order to implement the advantageous absolute measurement processing as described in patent specification U.S. Pat. No. 6,667,696. The embodiment of the encoder 41 as described in FIG. 5 thus allows for universal use of the incremental signal output according to the invention with prompt T (RT) and output D (RD) in combinations with a serial interface up to familiar absolute encoder designs (e.g. FIG. 3). This means that this encoder can be used for all incremental encoders and advanced absolute encoder applications for the exchange of values and alternatively allows for advantageous design with the inventive incremental output of angle and/or linear segments. In this manner these encoders can be employed by users who use incremental or already future-oriented absolute signal processing. Gradual development with the inventive incremental design via combination with the serial interface up to pure absolute signal processing is offered for controls still employing incremental signal processing at present. Therefore, conversion of the control including stocking of replacement parts for long-life machines and plants is secured with the inventive encoder design for the entire period of operation from the very outset and the currently prevailing obstacle to employment of absolute signal processing eliminated.

Figure 6:
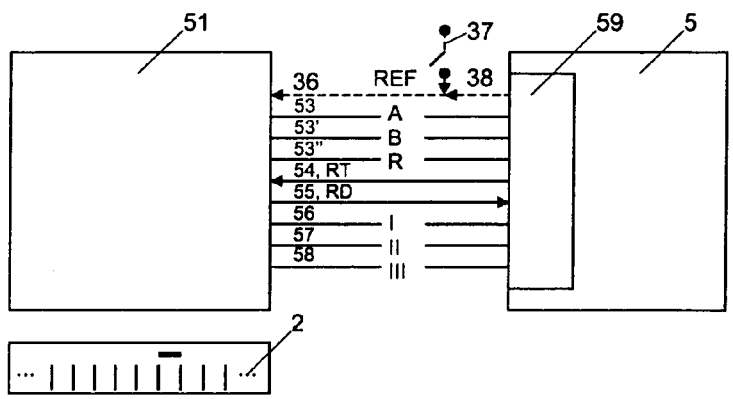
FIG. 6 shows further developed variants for the inventive solution.

FIG. 6 supplements the advantageous application of the incremental output according to the invention, as described in FIGS. 4 and 5, through formation of parallel signal output of, e.g. 120° phase-shifted and 180° long signals I, II, III (56, 57, 58). Thus these signal pulse strings correspond to a predetermined number of incremental angle or linear segments. This is expedient for encoder 51 with input REF 36, 37, 38, prompt RT 54, output RD 55 for measurement processing 59 with control 5, if the electronic commutation is to be continuously effected by electric motors through the encoder 51 and the incremental measured values A/B/R are not to be constantly used for evaluation. For this purpose an incremental scale 2, for example, is suitable if the auxiliary power and/or battery (rechargeable) ensures that the absolute measured value is formed via incremental signals even with the mains switched off.

FIG. 7 describes the basic functions according to the invention by means of a signal diagram in accordance with FIG. 4. The upper signal paths represent the logical increment outputs A/B/R 33, 33', 33". Only one direction of motion and thus A/B sequence is represented with the explanation. The lower two signal paths show the prompt RT 34 and output RD 35 in time sequence. It is well-known that the A/B signals are derived and output, for example, from the two low-order bits of the absolute value, i.e. of the binary digits $2^0+2^1$. The R-signal 33' is, for example, recorded either directly by the scale or generated by the input REF 36, 37, 38 in the logic and outputted separately. The logic functions are described in more detail in the block diagram of FIG. 10.

The embodiment according to the invention permits query of the distance to the reference position in every actual position and in every operating state. The sequence of signals is represented at the beginning in an operating movement with A, B and R-signals 33, 33', 33". The prompt RT 34 is effected at the time to, which is advantageously introduced by a short pulse from the measurement processing 39. At practically the same time transmission of the difference from the actual position to the reference position begins via the incremental output of the A/B signals. The beginning of to up $t_0$ the end $t_E$ of transmission of the distance to the reference position is indicated through the signal output RD 35 of measurement processing 39 and thus the control 5. Since the transmission requires finite time and the scanning device of the encoder 31 moving toward the scale thereby changes the actual position, these recorded incremental signals are also subsequently output with the A/B signals with transmission frequency $f_T$ and are represented with dashes in the signal path of the A/B signals. Thereafter, the signal transmission leads into the operating state as before the prompt RT 34 and into the incremental transmission of the actual position arising as a result of the movement. The end of transmission of the change in the actual position at the time $t_x$ can be recorded, for example, either by a short change in level in output RD 35 or through a change in the transmission frequency $f_T$ of the incremental signals which is higher than the operating frequency of the A/B signals in practical application. Point queries at time $t_0$ that are in demand for synchronous recording of movements in the servo-system monitored by instrumentation, in particular with multi-axis controls (e.g. printing machines, robots, etc.) are made possible with this signal evaluation according to the invention. Input REF 36 and thus definition of the R-signals 33" is not treated in more detail because it is easily comprehensible that this takes place by means of a signal REF 36, 37, 38 which stores the absolute value at this time as the value stored for the reference position in the logic of the encoder 31. This is also dealt with in FIG. 10.

Figure 8:
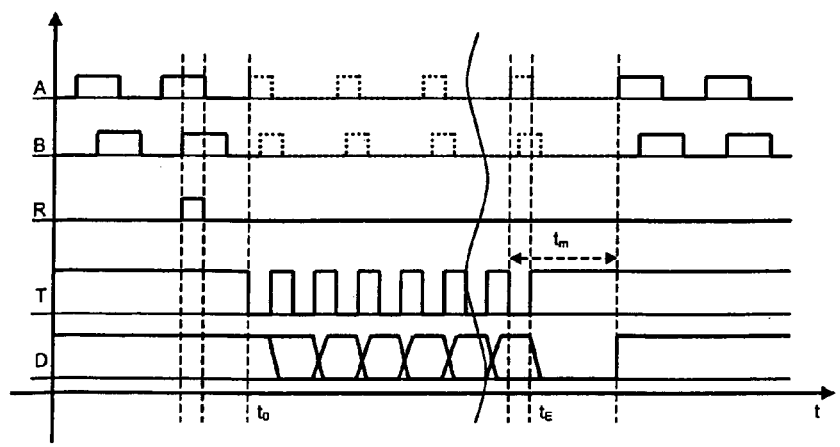
FIG. 8 is a diagram for encoder signals and measured data according to FIG. 5.

FIG. 8 represents the sequence of signals according to one of the possible embodiments in FIG. 5. The sequence of incremental output A/B/R 43, 43', 43" in combination with the SSI interface 44 for output of the deviation between the actual position and the reference position is shown in the diagram representation. Via the A/B/R lines the encoder 41 provides the incremental signals resulting in accordance with the measuring speed. The deviation resulting from the actual position vis-à-vis the valid reference position is queried by measurement processing 45 and/or control 5 via the negative flank of timing circuit T of the SSI interface 44 at the time $t_0$ of the prompt and via the timing circuit T this deviation of the increments is prompted in binary form for output by means of data line D. This familiar form with the customary SSI definitions will not be dealt with in greater detail here because it is known throughout industry and has been used with encoders for many years. The binary word (number of binary digits) has to exceed the measuring range in increments—e.g. in the case of rotary encoders with ~10.000 increments per revolution corresponding to $2^{10Bit}$, i.e. 10 bit positions—from the highest (MSB) to the lowest (LSB) bit at least in order to be able to output the greatest possible deviation. Subsequent to querying the binary digits the encoder returns to standby mode for a possible new query after time $t_m$ and/or prompt for determining the deviation to the reference position. According to the invention the incremental transmission from time $t_0$ of the moving measuring device is logically output to measurement processing 45 on the A/B/R signal paths with transmission frequency $f_T$, which is higher than the maximum operating frequency, during transmission of the deviation of the reference position to the actual position at time $t_0$ to $t_E$. Thus one can simply record the change in the actual position during output via the SSI interface and thus also secure the incremental output of the A/B/R signals if the frequency of the incremental signals exceeds the transmission frequency of the SSI interface at high operating speed. After the SSI output the actual position is output as usual via the A/B/R incremental output in the course of operation. Simple parameters for the encoder, data inputs, e.g. for arbitrary reference position values and other measurement data and error outputs, which substantially extend the incremental encoder in its range of functions may also be obtained by means of the serial interface.

FIG. 9 describes the encoder embodiment 31 described according to FIG. 4 in time sequence with multi-turn signal evaluation and output of these values via the R-signal path 33" after prompt RT 34 and during output RD 35. In this example it is presupposed that the reference position coincides with the starting point of the multi-turn recording so that the deviation of the actual position to the reference position within one revolution together with the entire number of multi-turn revolutions shows the true deviation of the multi-turn actual position in relation to the reference position. In the diagram of FIG. 7 the case of a single turn with incremental output via the signal paths A/B/R was described which also takes place here. The multi-turn values are only additionally indicated in the R-signal path which are output, for example, successively through incremental counting with the transmission frequency $f_T$ to the measuring evaluation 59 and there combined with the A/B incremental signals as the deviation of the multi-turn position from the reference value and made available to the control 5 for processing. If multi-turn values are possible in both directions vis-à-vis the reference position, then a distinction needs to be made on the R-output channel 33". This is achieved most simply through the use of two R-signal paths, e.g. $R_L$ and $R_R$ (L=left, R=right), or by means of a coded output in the R-signal path and/or in combination with the other signal paths (A, B; RT, RD) which for the sake of brevity will not be treated here in further detail.

Figure 10:
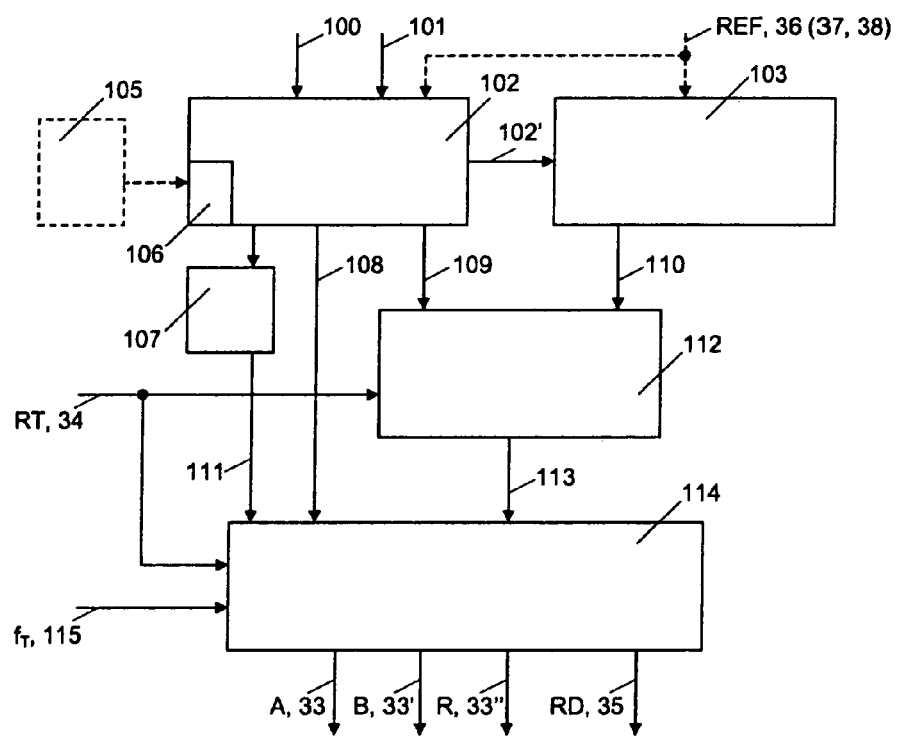
FIG. 10 is a block diagram for measured signal and measured data processing in the encoder according to the invention.

FIG. 10 describes the functions in a block diagram as they have been described in FIG. 7 with reference to FIG. 4. The total absolute value 102 from the encoder 31 is, for example, formed by the absolute base value (rough value) 100 of the coded segments (incremental division) and the absolute fine value 101 within the segments. This total absolute value 102 is constantly formed in the encoder and is available for further processing at any time in the operating state. The REF input 36, 37, 38 causes the simultaneous transfer of the total absolute value 102 via the binary output 102' to form the current value of the reference position 103, so that its value is likewise available in the form of a permanently stored binary data format capable of further processing. Likewise this reference position is constantly employed and stored as the reference value for forming multi-turn signals 107 with the REF input 36 in the block of total absolute value formation 102. For encoders 31 capable of separate multi-turn recording 105, e.g. when multi-turn recording is desired without a mains supply, these signals are recorded and stored within the scope of a limited and current-saving signal evaluation 106 within the block of total absolute value formation 102, e.g. through the use of auxiliary power. The output is then effected via the multi-turn signal generator 107 in the mains operated state.

In normal operation the respective total absolute value 102 is constantly provided to a counter and phase generator block 114 with its lowest two binary digits $2^0$, $2^1$ at least via the output 108. There the familiar formation of A-signals 33 and B-signals 33' with a phase-angle displacement of 90° is carried out using the two binary digits. The R-Signal 33" is obtained through generation of the difference from the supplied total absolute value 102, 109 as well as the supplied absolute reference position 103, 110 as the deviation from the reference position 112 and via the data link 113 to the counter and phase generator 114 if the difference amounts to zero. The output of R 33" as a 90° signal in conformity with the respective phase is effected as is well known via the logic function with the A/B signals in the counter and phase generator 114.

The very short prompt RT 34 immediately effects determination of the difference between the total absolute value 102 and the stored reference position 103 at this point in time $t_0$ as the deviation from the reference position 112 which is passed on as a data value 113 to the counter and phase generator 114. At the same time, the total absolute value 102, 108 is separated from the A/B signal output via prompt RT 34 in the counter and phase generator 114, and input of the multi-turn value 107, 111 including output RD 35 is effectively switched at the output and the deviation from the absolute reference position 112, 113, 114 is output via signal paths A (33) and B (33') via the timing circuit 115 for transmission frequency $f_T$. The same thing takes place for the multi-turn values 107, 111, 114, which are output in parallel via signal path R 33". The end of transmission of the deviation from the absolute reference position is achieved simply by counting out a counter value 114, which corresponds to the binary value of the deviation 112 and the multi-turn value 107. If the counter value 114 reaches zero, then the output RD 35 and multi-turn input 111 are subsequently blocked and the deviation in the actual position cumulated and numerically recorded in the interim is output on the A/B signal paths via the total absolute value input 102, 108, 114 and the deviation from the reference position 112, 113, 114 clocked with $f_T$. If these counters are also counted out at the time $t_x$, then the transmission frequency becomes ineffective and normal operation is introduced via the data inputs from the total absolute value 102, 108 as well as the deviation from the absolute reference position 112, 113 by means of the counter and phase generator (114).

The function in the block diagram described in FIG. 10 is only intended to clarify the embodiment and the method of the invention recited in the claims. The digital logic functions are described anyway, e.g. in highly complex FPGA components in a programming language (e.g. VHDL), or directly implemented in ASIC. Therefore various logic operations that correspond to the basic idea of the invention with the described functional sequences and embodiments are possible.

Figure 11:
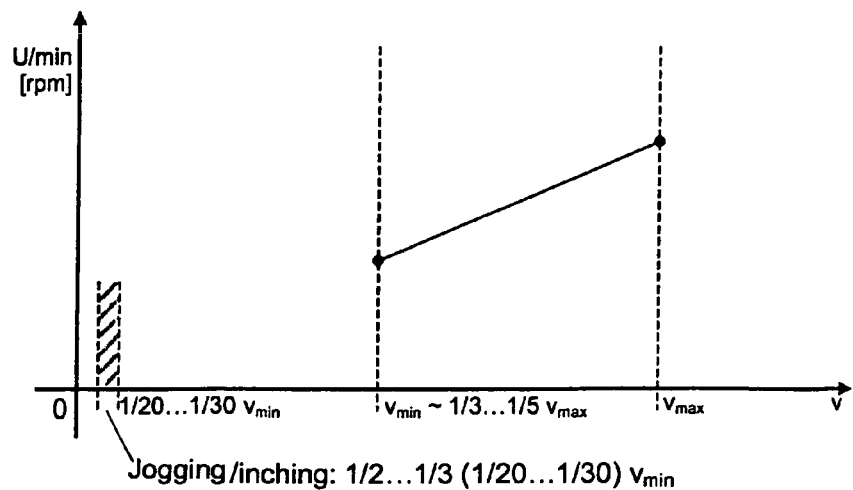
FIG. 11 is a diagram with different operating conditions and resolutions of angle or linear segments.

FIG. 11 shows an elegant solution of the embodiment according to the invention with a high-resolution incremental output by means of the A/B signal path in accordance with the diagram. Most machines for production in industry have defined operating states, e.g. creep speed, jogging movements for positioning and an operating speed range from 20% to 30% and up to 100% of the highest production speed. Absolute signal processing with, for example, digital computing logic allows for recognition of these different operating states and/or operating speeds and is thus able to suitably provide the angular and/or linear resolution as required for measured value output. Furthermore, external signals, which correspond to these selected operating states, can be supplied to the encoder in order to output the measured values with specific angular or linear resolutions. For example, in the case of offset printing machines the speed v amounts to the following for operation:

$v_{min}$ ... $v_{max}$ $v_{min}$~⅓ ... ⅕ $v_{max}$ creep speed 1/20 ... 1/30 $v_{min}$ jogging ½ ... ⅓(1/20 ... 1/30)$v_{min}$ Thus, for example, with transmission frequencies of $f_T$=200 kHz maximum of the A/B signals in operation ($v_{min}$ ... $v_{max}$) with the customary 10,000 pulses per revolution (=10 bits) the measuring resolution for creep speed or jogging can be increased to more than 64,000 pulses per revolution (16 bits) in order to thus obtain the required very precise positioning up to the 1 μm range and below.

Further disadvantages of past incremental encoder designs are eliminated with this embodiment according to the invention and, in addition, high-resolution position queries that are suitable for every operating state are made possible.

Apart from the conversion advantages and the additional functions, including security checks, this protected encoder design offers the further advantage that external evaluation and/or control does not have to constantly record the incremental signals and better utilization of the control is made possible by means of this uncoupling and measurement recording can be performed in any suitable operating state.

The specialist will be capable of deriving further embodiments through knowledge of the devices and the methods according to the invention, which likewise belong to the invention.

This application claims the priority, under 35 U.S.C. § 119, of German patent application No. 10 2004 045 849.9, filed Sep. 20, 2004; the entire disclosure of the prior application is herewith incorporated by reference.

I claim:

1. An encoder device for determining absolute angle and/or linear segments, comprising:
   means for forming continuously an absolute value of an actual position;
   means for forming a distance value, the distance value being a difference between the absolute value of the actual position and any given reference position upon prompt; and
   means for outputting the distance value by means of incremental signals.

2. The device according to claim 1, comprising additional means for recording values of angle and/or linear segments resulting at the same time during a transmission of the distance with reference to the actual position and outputting these values.

3. The device according to claim 1, comprising additional means for recording the output of the distance value from the beginning to the end of the outputting and providing this information for evaluation.

4. The device according to claim 1, comprising additional means for forming the distance value upon prompt in every operating state.

5. The device according to claim 1, comprising additional means for forming and outputting at least one signal pulse string with a predetermined number of incremental angle and/or linear segments.

6. The device according to claim 1, comprising additional means for selectably exchanging values by means of incremental signals and/or serial data.

7. The device according to claim 1, further comprising:
   means for changing resolutions of measured values according to given operating states; and
   means for outputting information about the resolutions by means of incremental signals.

8. The device according to claim 7, comprising additional means for forming and outputting at least one signal pulse string with a predetermined number of incremental angle and/or linear segments.

9. The device according to claim 7, comprising additional means for selectably exchanging values by means of incremental signals and/or serial data.

10. A method for determining absolute angle and/or linear segments with an encoder device according to claim 1, which comprises the steps of:
    forming continuously an absolute value of an actual position;
    forming a distance value, the distance value being a difference between the absolute value of the actual position and any given reference upon prompt; and
    outputting of the distance value by means of incremental signals.

11. The method according to claim 10, which comprises recording and outputting angle and/or linear segments resulting at the same time during a transmission of the distance with respect to the actual position.

12. The method according to claim 10, which comprises recording output of the distance value from the beginning to the end of the outputting and providing the information for evaluation.

13. The method according to claim 10, which comprises forming the distance value upon prompting in every operating state.

14. The method according to claims 10, which comprises forming and outputting at least one signal pulse string according to a pre-determined number of incremental angle and/or linear segments.

15. The method according to claims 10, which comprises selectably exchanging values via incremental signals and/or serial data.

16. A method for determining absolute angle and/or linear segments with an encoder device according to claim 7, which comprises the steps of:
    forming resolutions of measured values according to given operating states; and
    outputting information about the resolutions by means of incremental signals.

17. The method according to claims 16, which comprises forming at least one signal pulse string arid outputting according to a predetermined number of incremental angle and/or linear segments.

18. The method according to claims 16, which comprises selectably exchanging values via incremental signals and/or serial data.

* * * * *